United States Patent Office
3,387,064
Patented June 4, 1968

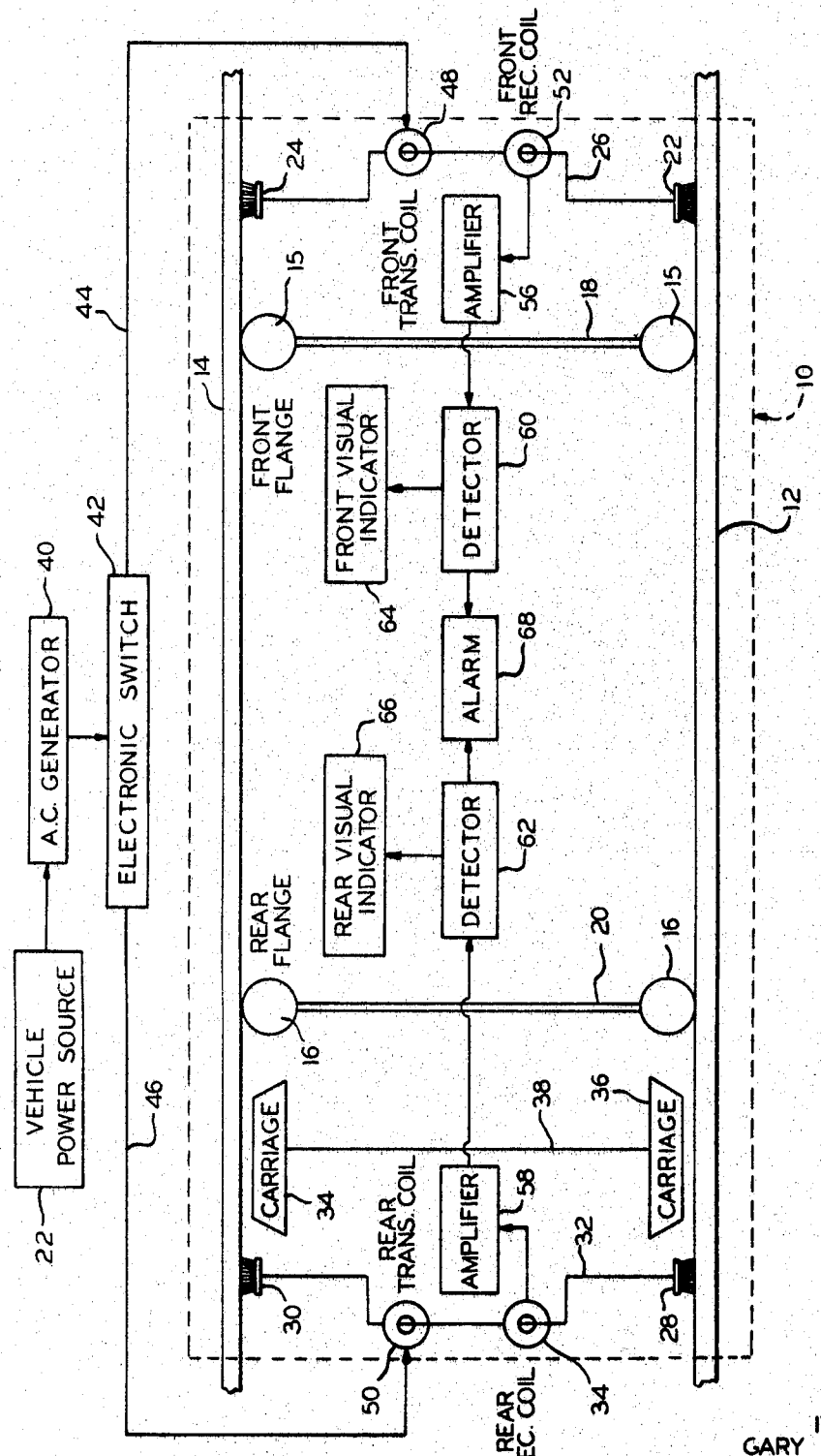

3,387,064
RAIL SHUNT RESISTANCE INDICATING
SYSTEM
Ivan L. Joy, 1616 W. 29th St. 66611; Gary M. Hoffsommer, R.F.D. 4 66603; Donald L. Muyskens, 245 E. 29th St. 66605; and Merlin G. Reiter, 1901 Wilcox Court 66608, all of Topeka, Kans.
Filed May 2, 1966, Ser. No. 546,691
9 Claims. (Cl. 264—1)

ABSTRACT OF THE DISCLOSURE

A circuit continuity checking and indication system for use on railway vehicles whose wheel and rail contact may not provide the proper shunt characteristics needed to actuate the block signal system. The circuit checking and indicator system is located on the vehicle and uses signal circuit means in series with the two rails so that the wheels and axles of the vehicle may complete said circuit. An indication is given whenever the circuit is not properly completed.

---

The present invention is directed to a system which will provide an adequate warning as to the failure of shunt resistances used on railway equipment to actuate railroad signaling apparatus. The invention is particularly applicable to various types of railway vehicles which are relatively light in weight as compared to the weight of trains which operate on the track.

Railroad signaling systems are designed for low voltage and high current signal actuating techniques. Alternating current is supplied to the rails and signal systems are designed so that when the rails are shunted, as by the passage of vehicles over the rails, relays are actuated to activate other apparatus, as for example, apparatus to turn the appropriate electrical lighting signals, on and off. Systems of this type are designed for use with the relatively heavy rolling stock of the railroads and the systems work well with this type of rail vehicle. However, other classes of rail vehicles are relatively light as compared with the normal locomotive freight car and passenger car rolling stock. For example, various types of railway maintenance equipment or crew-carrying cars are relatively light in weight and the wheels of the equipment do not make ample contact between the wheel flanges and the rail to provide the proper shunt to in turn cause actuation of the signal lights. Some types of maintenance equipment are carried on rubber tires while having flanging wheels. In this relatively light class of equipment, shunting brushes have been carried on the vehicles so as to provide a proper shunt characteristic to actuate the signals. These brushes have been carried in fixed relation to the wheels with a circuit connecting pairs of brushes which sometimes are disposed so that a pair of brushes are at the front of the vehicle and a pair of brushes are at the rear of the vehicle. Rail signaling systems are customarily set up so that they will be actuated by a shunt resistance between the rails of .06 ohm or less. With a much greater resistance, the signals will not be actuated properly, even though the signals will sometimes operate with more than the stated resistance of .06 ohm.

In order to provide adequate safety for rail vehicles of the relatively light weight class, it is imperative that these vehicles be provided with some means for providing the proper shunt resistance, and in the event that the shunt resistance system so provided does not operate satisfactorily, some system should be provided to give adequate warning. One cannot simply measure the current between the shunting brushes for the reason that the shunting current will vary along the various parts of the railroad track. The relays used to operate the signaling equipment may be set up to operate with varying values of current. Furthermore, when brushes are used as a shunting device, the flanged wheels of the vehicle or other parts of the working apparatus of the vehicle may at times shunt the rails although with varying degrees of shunting characteristics. This in turn will cause a variance in the current passing between the brushes so that measurement of the shunting current cannot be relied upon as a means of indicating that the shunting system is working properly.

With the foregoing in mind, the primary purpose of the present invention is to provide a system for detecting and indicating the shunting characteristics of a railway vehicle in a manner which is independent from the rail carried signal passing through the shunting brush wires, all without disturbing the rail signaling system, and while providing a positive indication of the safe or unsafe characteristics of the railway signal shunting system. The principles of the invention, while created for vehicles with shunting brushes, may also be applied to ordinary track vehicles without brushes and of much heavier weight than maintenance equipment. For example, the principles of the invention may be utilized with the normal axle and flanged wheels of rolling stock.

A related purpose of the invention is to provide a system which will indicate which brushes of a plural set of brushes are working properly or improperly in a rail signal shunting system.

Other purposes will appear from time to time in the course of the following specification and claims when taken with the accompanying drawings, in which:

The figure is a diagrammatic view of a typical rail shunting system employing the features of the present invention.

Like elements are designated by like characters throughout the specification and drawings.

With particular reference now to the drawing, the numeral 10 generally designates a railway vehicle which may be taken as generally representative of vehicles of diverse types. It may be, for example, representative of a rail flaw detector car, a crew-carrying car, or other relatively light weight rail weight vehicles such as may be found in some instances of tamping vehicles, track straightening vehicles, track aligning vehicles, and vehicles carrying other tools for track working operations. Vehicles of this class sometimes have supporting wheels in the form of normal flanged wheels which engage the rails 12 and 14 to support the vehicle and to propel the same along the track. In other cases, vehicles of this class may have simple rubber-tired wheels and auxiliary wheels which take the place of flanges to hold the vehicle supporting wheels on the track. This is diagrammatically represented in the drawings by the showing of the front flange wheels 15 and the rear flange wheels 16. These are shown in a fashion intended to be representative of either the normal flanges for holding the vehicle wheels on the track or the separate wheels which engage the sides of the rail head to hold the vehicle on the track. If the wheels are flanged wheels, they may be connected by axles as designated at 18 and 20, respectively. If, instead of flanges, separate rollers or wheels are employed, the metallic framework supporting the wheels may serve to conduct or partially conduct current and this may also be taken as represented by the members 18 and 20 in the figure.

Vehicles of this class customarily carry their own power source and this is diagrammatically represented at 22 in the drawings. Power source 22 may be a 12-volt battery system.

As illustrated in the drawings, the shunting circuit for the vehicle 10 is provided by front and rear pairs of brushes. For example, the front pair of brushes includes brushes 22 and 24 which are carried by the vehicle in a fixed relation so as to engage the sides of the heads of the rails 12 and 14. Brushes 22 and 24 are connected by a wire 26 forming a shunting circuit between the two brushes 22 and 24 and across the rails 12 and 14. The rear pair of brushes 28 and 30 likewise are carried in a fixed relation by the vehicle so as to engage the inner sides of the heads of the rails 12 and 14. Brushes 28 and 30 are also connected by a wire 32 which provides a shunting circuit between the brushes 28 and 30 and the rails 12 and 14. With an arrangement of this sort, the two rails 12 and 14 of the track are shunted by either one or both pairs of brushes so as to shunt the track circuit and cause actuation of the appropriate track signals.

Vehicles of this type may also carry certain classes of working equipment which is diagrammatically represented by the members 34 and 36 which are shown connected by a frame member diagrammatically represented at 38. The members 34 and 36 may be considered as generally representative of certain types of working equipment carried by the vehicle. For example, it may be representative of a carriage carried by a rail flaw detecting vehicle, which carriage may be positioned for contact with the two opposite rails and thus provide some shunting characteristics for the two rails. It may be representative of certain other types of right of way working equipment which will effectively span the rails and provide a shunting characteristic.

In accordance with the present invention, the vehicle is provided with means to induce a separate signal in the shunting circuits 26 and 32 in a manner such that it will not interfere with the normal track working signals for the railway signaling apparatus. This is attained by providing the vehicle with an alternating current generator 40 which is driven by the vehicle power source 22. The generator 40 is of a class which will produce an alternating current of a frequency which is nonharmonic to the frequency normally used with the track circuit. For example, normal track circuits may operate at 60 cycles per second or 25 cycles per second while the generator 40 is set to operate in the range of somewhere between 600 cycles per second and 3600 cycles per second. Generator 40 is also of a class delivering a relatively low voltage and amperage.

Generator 40 is connected to a switch 42 which may be of a timing type of switch or relay operating to alternately supply the signal from the generator 40 through lines 44 and 46 which lead to the front and rear set of brushes, respectively. Line 44, for example, leads to a transducer coil 48 which surrounds the line 26 so as to induce a signal in the circuit provided by the line 26. Line 46 on the other hand leads to a coil 50 which surrounds line 32 of the rear pair of brushes so as to induce a signal in the circuit provided by the wire or line 32 between the rear set of brushes. The voltage induced in the lines 26 and 32 may be on the order of .01 volt while the current is on the order of .25 ampere.

Switch 42 may be set to switch the alternating current transmission signal from line 44 to line 46 at the rate of something on the order of 2 to 20 times per second. Switches of this type are known to the electronic arts. The current supplied to the coils 48 and 50 thus induces a frequency in the circuits 26 and 32 for the front and rear pairs of brushes. Pick up coils 52 and 54 surround the lines 26 and 32, respectively, and the output from these pick up coils is fed to amplifiers 56 and 58, respectively. The current induced in the brush circuits 26 and 32 is a very low voltage high current which may be characterized as a stiff source of supply. After amplification, the signals are transmitted from the amplifiers 56 and 58 to detectors 60 and 62, respectively. The detectors 60 and 62 may take the form of transistor switches which will close contacts when the current supplied to the detectors is below a predetermined low value. Switches of this type are known to the art. The contacts so closed are used to actuate visual indicators 64 and 66 for the front and rear sets of brushes, respectively. The visual indicators may take the form of indicating lights. The same closed contacts close a circuit leading to an audio alarm 68 which may take the form of a buzzer or a bell.

As the resistance of the brush circuits is increased, the current induced in the pickup coils is decreased and vice versa. The system may be calibrated so that whenever the shunt resistance of either pair of brushes and the circuits associated therewith exceed .06 ohm, the signal picked up and amplified will operate the detector switches so as to close the circuits for the alarm and visual indicators. Thus, the system, when in operation, will always enable the occupants of the vehicle to know whether or not the shunting resistance of the vehicle is proper so as to cause proper actuation of the track signals.

If the flanges are diagrammatically represented by the elements 15 and 16 in the figure and/or if the carriage as represented by the elements 34 and 36 in FIGURE 1 provide added conductive paths for the track current and the system herein described, that does not adversely affect the system but it simply makes the shunt resistance system that much safer. The signal induced in either the front brush circuit or the rear brush circuit may be transmitted down the rails 12 and 14 to the other brush circuit. The current of the signal so transmitted may also pass between the carriage elements and the wheel flange elements represented at 15 and 16. Thus, the signal may make a complete loop through both front and rear sets of brushes regardless of whether line 44 or line 46 is energized and regardless of whether or not a part of the signal is absorbed by the wheel flange elements and/or the carriage elements. The system nonetheless measures the effective shunt resistance of the vehicle and if that exceeds .06 ohm, the alarm sounds.

The indicating system considers the shunting effect of extra wheels, carriages, etc. so that if the shunting effect of the entire vehicle is satisfactory, the system will so indicate.

The principles of the system may be utilized by eliminating either the front or rear transducer and pickup coils and eliminating the amplifier connected therewith. In that event, a signal may be supplied to only one set of brushes to indicate the shunting resistance of the vehicle.

While the system is shown and described as primarily applied to a vehicle carrying shunting brushes, it should be understood that the principles of the invention may also be applied to heavier rolling stock wherein the pairs of flanged wheels are utilized to span the rails and shunt the track. In this event, the toroid type transducer and pickup coils, as indicated by the coils 50 and 34, for example, in the figure, may be made large enough to surround a six-inch axle of the normal flanged wheels so as to induce a signal as described herein in the axle and then pick up the signal induced so as to provide an indication of whether or not the flanged wheels are making proper shunting contact.

The system as thus described enables an accurate measurement of the shunt resistance provided by the brushes and enables the occupants of the vehicle to know whether one or both pairs of brushes are operating incorrectly with too much shunt resistance.

Whereas we have shown and described an operative form of the invention, it should be understood that this showing and description thereof should be taken in an illustrative or diagrammatic sense only. There are many modifications in and to the invention which will be apparent to those skilled in the art and which will fall within the scope and spirit thereof. The scope of the invention should be limited only by the scope of the hereinafter appended claims.

We claim:

1. A rail shunt resistance indicating system for track supported vehicles of the type having means adapted to shunt a railroad track circuit including front and rear pairs of brushes each adapted to engage the opposite rails of a railroad track at spaced positions, and circuit means connecting the brushes of each pair, generating means for supplying a signal to the circuit means of at least one pair with the signal supplied being of such a low voltage and low current as to be in a non-interfering relation with the track circuit, signal pickup means connected with the circuit means to which the signal is supplied, and indicating means operable in response to a predetermined low intensity output signal from said pickup means to give a warning of a predetermined high resistance characteristic of said circuit means.

2. The structure of claim 1 characterized by and including switching means for alternately supplying the generated signal to the circuit of each pair of brushes, each circuit having a pickup coil associated therewith and indicator means as specified in claim 1 associated therewith.

3. A system as set forth in claim 2 wherein said indicating means includes a visual indicator for each pair of brushes and a common audio indicator.

4. The system of claim 1 wherein the signal generated and supplied to said brushes is at a frequency in a non-harmonic relation to the frequency of the track signal system with which the indicating system is used.

5. A rail shunt resistance indicating system for track supported vehicles of the type having means adapted to shunt a railroad track circuit including front and rear pairs of brushes each adapted to engage the opposite rails of a railroad track at spaced relation, circuit means connecting the brushes of each pair, generating means for supplying a signal to the circuit means of each with the signal supplied being of such low voltage and low current as to be in a non-interfering relation with the track circuit, switching means for alternately supplying the generated signal to the circuit of each pair of brushes, each circuit having a pickup coil associated therewith, and indicating means connected to said pickup coils and operable in response to a predetermined low intensity current output signal from said pickup means to give a warning of an excessively high resistance characteristic of both circuits.

6. A system as set forth in claim 5 wherein said indicating means includes a visual indicator for each pair of brushes and a common audio indicator.

7. A rail shunt resistance indicating system for track supported vehicles of the type having means adapted to shunt a railroad track circuit including means engaging the opposite rails of a railroad track, and circuit means therefor to provide a circuit across said rails, generating means for supplying a signal to the circuit means with the signal supplied being of such low voltage and low current as to be in a non-interfering relation with the track circuit, signal pickup means connected with the circuit means to which the signal is supplied, and indicating means operable in response to a predetermined low intensity output signal from said pickup means to give a warning of a predetermined high resistance characteristic of said circuit.

8. A system as set forth in claim 7 wherein said means engaging the rails of the track are the flanged wheels of a railway vehicle, said signal is supplied to the axle connecting the wheels and said signal pickup means is associated with said axle.

9. A system as set forth in claim 7 wherein said means engaging the rails of a track are in the form of shunting brushes.

No references cited.

EUGENE G. BOTZ, *Primary Examiner.*